(12) United States Patent
Murthy et al.

(10) Patent No.: US 9,767,290 B2
(45) Date of Patent: Sep. 19, 2017

(54) AUTONOMOUS REASONING SYSTEM FOR VULNERABILITY ANALYSIS

(71) Applicant: FUJITSU LIMITED, Kawasaki-shi, Kanagawa (JP)

(72) Inventors: Praveen Murthy, Fremont, CA (US); Bogdan Copos, Davis, CA (US); Thuan Pham, Sunnyvale, CA (US)

(73) Assignee: FUJITSU LIMITED, Kawasaki (JP)

( * ) Notice: Subject to any disclaimer, the term of this patent is extended or adjusted under 35 U.S.C. 154(b) by 109 days.

(21) Appl. No.: 14/795,812

(22) Filed: Jul. 9, 2015

(65) Prior Publication Data

US 2016/0259943 A1 Sep. 8, 2016

Related U.S. Application Data

(60) Provisional application No. 62/128,932, filed on Mar. 5, 2015.

(51) Int. Cl.
*G06F 21/57* (2013.01)
*G06F 9/445* (2006.01)
*G06F 9/44* (2006.01)

(52) U.S. Cl.
CPC .............. *G06F 21/577* (2013.01); *G06F 8/65* (2013.01); *G06F 8/68* (2013.01); *G06F 2221/033* (2013.01)

(58) Field of Classification Search
CPC .................................................... G06F 21/577
See application file for complete search history.

(56) References Cited

U.S. PATENT DOCUMENTS

| 7,784,044 | B2* | 8/2010 | Buban ....................... G06F 8/67 717/168 |
| 2011/0138469 | A1* | 6/2011 | Ye ......................... G06F 21/577 726/25 |
| 2013/0019314 | A1* | 1/2013 | Ji ........................... H04L 67/02 726/25 |
| 2014/0165204 | A1* | 6/2014 | Williams ................ G06F 21/55 726/25 |

* cited by examiner

*Primary Examiner* — Kambiz Zand
*Assistant Examiner* — Thanh Le
(74) *Attorney, Agent, or Firm* — Maschoff Brennan

(57) ABSTRACT

A method of vulnerability analysis of a deployed program (program) includes inputting a binary program under analysis (BPUA) derived from the program. The method includes analyzing input/output (I/O) behavior of the program. The method includes discovering inputs to the program based on application of exploration techniques to the BPUA and analysis of the I/O behavior. The method includes determining which of the inputs are negative inputs. The negative inputs are inputs that trigger a response that includes a vulnerability of the program. Based on the negative inputs and triggered responses, the method includes developing a patch for the program that modifies the program to process at least some of the negative inputs without triggering a response that includes the vulnerability. The method includes automatically dispatching the patch.

20 Claims, 7 Drawing Sheets

AUTONOMOUS REASONING SYSTEM FOR VULNERABILITY ANALYSIS

CROSS-REFERENCE TO RELATED APPLICATIONS

This patent application claims the benefit of and priority to U.S. Provisional Patent Application No. 62/128,932 filed Mar. 5, 2015, which is incorporated herein by reference in its entirety.

FIELD

The embodiments discussed herein are related to an autonomous reasoning system for vulnerability analysis.

BACKGROUND

Current practice in software development may involve testing and verification of software during the development phase. However, many bugs and corner cases may not be resolved satisfactorily. The testing during the development phase may not resolve all of the bugs or corner cases because testing for complete coverage is generally intractable and may take far more time and resources than economically viable.

Current practice may also involve security consultants and companies that specialize in security detecting software vulnerabilities in software. After vulnerabilities are detected, the security consultants may submit them to the original software developers. The original software developers may then be relied upon to develop a patch. However, original software developers may no longer exist or may avoid expending resources patching the vulnerability. Even if a patch is developed, redeploying the patch for a majority of users of the software may involve substantial time and expenditures of resources and may depend on a user(s) diligence in applying updates.

Another approach to remedy software vulnerabilities is to develop signatures for exploits and block them via anti-virus and anti-malware scanners deployed on client sites. However, this approach may only be effective for known threats. As a result, the anti-virus scanners do not fix unknown software vulnerabilities that allow viruses or malware to be effective.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of vulnerability analysis of a deployed program may include inputting a binary program under analysis (BPUA) derived from the deployed program. The method may include analyzing input/output (I/O) behavior of the deployed program. The method may include discovering inputs to the deployed program based on application of two or more exploration techniques to the BPUA and analysis of the I/O behavior. The method may include determining which of the inputs are negative inputs. The negative inputs may include a portion of the inputs that trigger a response that includes a vulnerability of the deployed program. Based on the negative inputs and triggered responses, the method may include developing a patch for the deployed program that modifies the deployed program to process at least some of the negative inputs without triggering a response that includes the vulnerability. The method may include automatically dispatching the patch to the deployed program.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

As the complexity of software grows, the complexity of systems for testing such software comprehensively also grows. Current software testing practice may include testing software before release and fixing bugs following release as the bugs are found. Due to increasing cybercrime, fixing bugs following release is problematic as it may lead to constant "0-day" attacks that exploit previously unknown vulnerabilities.

Accordingly, in some embodiments disclosed herein, an autonomous reasoning system (ARS) may be deployed. The ARS may be deployed apart from a deployed program that the ARS is implemented to test. The ARS may constantly monitor the deployed program for vulnerabilities, and fixes the deployed program without or with minimal human intervention. The ARS may run along with the deployed program, and may detect vulnerabilities outside of the normal testing and verification flows in a software release cycle of the deployed program. The ARS may work autonomously as it may be deployed on client sites, far away from the development teams that built the deployed program. Furthermore, the ARS may autonomously execute and patch detected threats and fixes in "machine time" rather than "human time."

In some embodiments, the ARS may continuously test the deployed program for vulnerabilities using both program analysis techniques and I/O behavioral analysis. The ARS may continuously search for inputs that may trigger a software vulnerability resulting in a crash. The ARS may develop patches that automatically fix the deployed program so that future crashes may not occur on the particular input that triggered the vulnerability.

The ARS may combine several types of software analysis for finding software vulnerabilities. For example, the ARS may analyze input/output (I/O) behavior as gleaned from console interactions and/or network traffic that are applied to the deployed program while running. The ARS collects the information (both for inputs that trigger crashes and for inputs that do not), develops patches for the inputs that trigger crashes, and applies patches as necessary. This and other embodiments are described with reference to the appended drawings.

Figure 1:
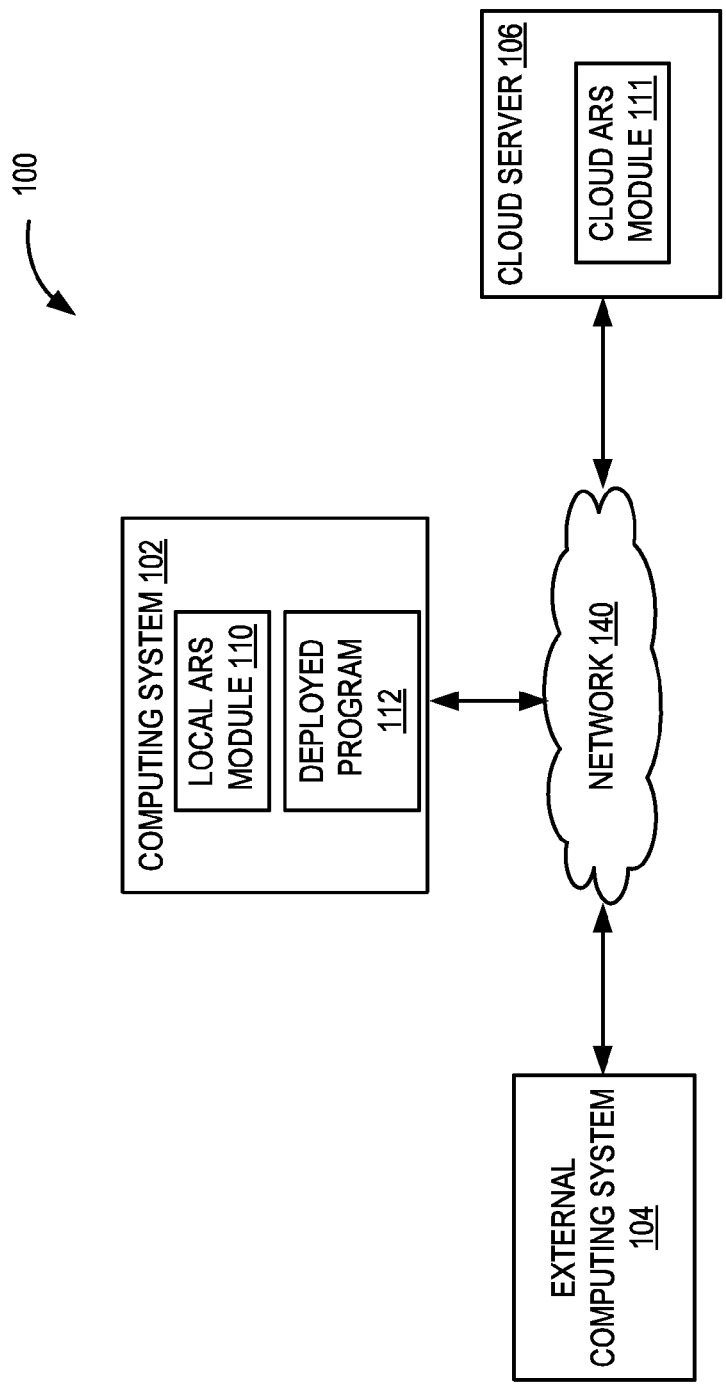
FIG. 1 is a block diagram of an example system in which one or more embodiments may be implemented.

FIG. 1 is a block diagram of an example system 100, in which some embodiments may be implemented. The system 100 may include a local ARS module 110 implemented in a computing system 102 and/or a cloud ARS module 111 implemented in a cloud server 106. The local ARS module 110 and the cloud ARS module 111 are referred to together as the ARS module 110/111. The ARS module 110/111 may be configured for vulnerability analysis of a deployed program 112. The vulnerability analysis may be performed continuously, substantially continuously, periodically, or at some interval.

In general, the vulnerability analysis performed by the ARS module 110/111 may include discovery of inputs to the deployed program 112. The inputs may include a set or string of data, a type of data, a sequence of data, a particular datum such as a number, symbol, etc., or some combination thereof. Responses of the deployed program 112 to the inputs may be ascertained. In some embodiments, the responses may be ascertained from exploration technique and/or from analysis of input output (I/O) behavior of the deployed program 112. The ARS module 110/111 may determine which of the inputs result in a response that includes a vulnerability of the deployed program 112 (negative inputs). The ARS module 110/111 may then develop and/or dispatch a patch that modifies the deployed program 112 such that the negative input no longer results in the response that includes the vulnerability.

The deployed program 112 may include any software program. In the depicted embodiment, the deployed program 112 may have been released by its manufacturer for general dissemination to the public. For example, the ARS module 110/111 may be implemented following release of the deployed program 112 without coordination between the manufacturer of the deployed program 112 and another entity overseeing the ARS module 110/111. Generally, the deployed program 112 may not be related to the ARS module 110/111, as previous knowledge regarding of the deployed program 112 may not be involved in the vulnerability analysis performed by the ARS module 110/111.

In the system 100, the computing system 102, the cloud server 106, and an external computing system 104 may communicate via a network 140. Each of the computing system 102, the cloud server 106, the external computing system 104, and the network 140 are discussed briefly below.

The network 140 may include a wired and/or wireless network, and may have any suitable configuration, such as a star configuration, a token ring configuration, or other configurations. Furthermore, the network 140 may include a local area network (LAN), a wide area network (WAN) (e.g., the Internet), and/or other interconnected data paths across which multiple devices may communicate. In some embodiments, the network 140 may include a peer-to-peer network. The network 140 may also be coupled to or include portions of a telecommunications network that may enable communication of data in a variety of different communication protocols.

In some embodiments, the network 140 includes BLUETOOTH® communication networks and/or cellular communications networks for sending and receiving data including via short messaging service (SMS), multimedia messaging service (MMS), hypertext transfer protocol (HTTP), direct data connection, wireless application protocol (WAP), e-mail, etc. The network 140 may enable communication via a standard-based protocol or another suitable protocol (e.g., Wi-Fi).

The external computing system 104 may include any computing devices such as a hardware server, a personal computer, mobile computer, mobile devices, and the like. The external computing system 104 may include memory, one or more processors, and hardware used to communicate via the network 140.

The external computing system 104 may interface with the computing system 102 and the deployed program 112. For example, the deployed program 112 may receive input via the network 140 from the external computing system 104 and/or provide responses to the external computing system 104 via the network 140. The communication of input and responses from the external computing system 104 and the computing system 102 may be an example of network traffic, which may be used by the ARS module 110/111. In some embodiments, a user may operate a console on the external computing system 104. Operation of the console may provide input to the deployed program 112.

The cloud server 106 may include a hardware server with memory, one or more processors, and a capability to communicate via the network 140. The cloud server 106 may have loaded thereon the cloud ARS module 111. The cloud ARS module 111 may be configured to operate substantially similarly to the local ARS module 110. The cloud ARS module 111 may be loaded remotely to the computing system 102 on which the deployed program 112 is loaded. In embodiments implementing the cloud ARS module 111, the computing system 102 may not have the local ARS module 110. Instead, the cloud ARS module 111 may remotely access the computing system 102 and/or the deployed program 112 to perform the vulnerability analysis or some portions thereof as discussed elsewhere in this disclosure.

The computing system 102 may include any computing devices such as a hardware server, a personal computer, mobile computer, mobile devices, and the like. The computing system 102 may include memory, one or more processors, and hardware used to communicate via the network 140. Some additional details of the computing system 102 are provided with reference to FIG. 2.

The computing system 102 may have loaded thereon the local ARS module 110 and the deployed program 112. The local ARS module 110 may interact with the deployed program 112 to perform the vulnerability analysis of the deployed program 112. While deployed on the computing system 102, a user may interact with the deployed program 112 using some hardware component such as a console. For example, the user may provide input to the deployed program 112 via the console and receive responses via the console or another hardware component of the computing system 102. The local ARS module 110 and/or the cloud ARS module 111 may use the console interaction to find vulnerabilities in the deployed program 112.

The ARS module 110/111 may include code and routines configured for vulnerability analysis of the deployed program 112. The vulnerability analysis may include finding and patching vulnerabilities in the deployed program 112. In some embodiments, the ARS module 110/111 may be implemented using hardware including, for example, a field-programmable gate array (FPGA) or an application-specific integrated circuit (ASIC). In some other instances, the ARS module 110/111 may be implemented using a combination of hardware and software.

Implementation in software may include rapid activation and deactivation of one or more transistors or transistor elements such as may be included in hardware of the computing system 102 and/or the cloud server 106. Additionally, software defined instructions may operate on information within transistor elements. Implementation of software instructions may at least temporarily reconfigure electronic pathways and transform computing hardware.

In the depicted embodiment, the ARS module 110/111 may be configured to analyze the deployed program 112 for vulnerabilities. The vulnerabilities might include a memory corruption error, a buffer overflow, a software crash, and arithmetic errors (e.g., divide by 0), for example. Additionally, the ARS module 110/111 may be configured to analyze I/O behavior of the deployed program 112. The I/O behavior may be based on the console interactions and/or the network traffic described elsewhere in this disclosure. In some embodiments, analyzing the deployed program 112 for the vulnerabilities and analyzing the I/O behavior may occur while the deployed program 112 is running.

The ARS module 110/111 may analyze input/output (I/O) behavior of the deployed program 112. In some embodiments, the I/O behavior may include console interactions of a user with the deployed program and/or network traffic communicated with the deployed program 112. The network traffic may be captured by the ARS module 110/111. To find the vulnerabilities of the deployed program 112, the ARS module 110/111 may be configured to discover and/or collect inputs and responses that result from processing the inputs. The ARS module 110/111 may discover inputs to the deployed program 112 and determine which of the inputs trigger a response that includes a vulnerability of the deployed program 112 (negative inputs) and which of the inputs trigger a response that does not include a vulnerability of the deployed program 112 (positive inputs).

The inputs may be discovered using multiple exploration techniques and/or the I/O behavior. In some embodiments, the multiple exploration techniques may include two or more exploration techniques, which may include symbolic execution process of the BPUA, side-channel input generation process for unknown program behavior, and stateful model generation process configured to capture a state machine of the deployed program 112 at an abstract level.

Based on the negative inputs, the positive inputs, and responses triggered by the negative inputs and the positive inputs, the ARS module 110/111 may develop a patch for the deployed program 112. The patch may modify the deployed program 112 to process at least some of the negative inputs without triggering a response that includes the vulnerability. The ARS module 110/111 may automatically dispatch the patch to the deployed program 112.

In some embodiments, the inputs and the responses may be stored as test cases in a test database. The test cases may include positive test cases and negative test cases. The positive test cases may be based on the positive inputs and associated responses. The negative test cases may be based on the negative inputs and associated responses. The ARS module 110/111 may test and develop the patch based on the test cases.

Modifications, additions, or omissions may be made to the system 100 without departing from the scope of the present disclosure. For example, the present disclosure may apply to systems that may include one or more of the external computing systems 104, one or more cloud servers 106, one or more computing systems 102 with one or more deployed programs 112, or any combination thereof.

Moreover, the separation of various components in the embodiments described herein is not meant to indicate that the separation occurs in all embodiments. It may be understood with the benefit of this disclosure that the described components may be integrated together in a single component or separated into multiple components.

Figure 2:
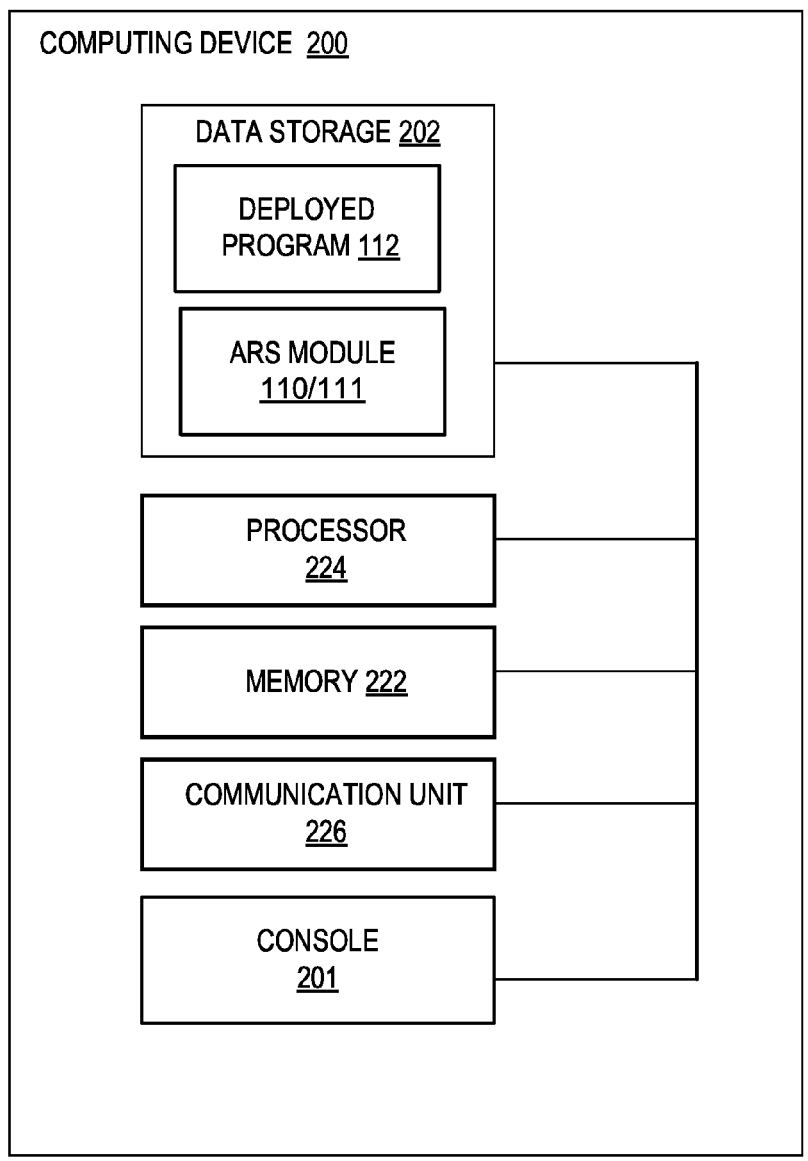
FIG. 2 illustrates an example computing system that may be implemented in the system of FIG. 1.

FIG. 2 illustrates an example computing device 200. The computing device 200 may be configured for vulnerability analysis of the deployed program 112. The computing device 200 may include one or more processors 224, a memory 222, a data storage 202 that includes the ARS module 110/111 and may include the deployed program 112, a communication unit 226, and a console 201. The computing device 200 may correspond to the computing system 102 of FIG. 1. Additionally, the computing device 200 may be substantially similar to the external computing system 104 and/or the cloud server 106 of FIG. 1.

The processor 224 may include any suitable special-purpose or general-purpose computer, computing entity, or processing device including various computer hardware or software modules and may be configured to execute instructions stored on any applicable computer-readable storage media. For example, the processor 224 may include a microprocessor, a microcontroller, a digital signal processor (DSP), an ASIC, an FPGA, or any other digital or analog circuitry configured to interpret and/or to execute program instructions and/or to process data.

Although illustrated as a single processor in FIG. 2, it is understood that the processor 224 may include any number of processors configured to perform individually or collectively any number of operations described in the present disclosure. Additionally, one or more of the processors 224 may be present on one or more different electronic devices. In some embodiments, the processor 224 may interpret and/or execute program instructions and/or process data stored in the memory 222, the data storage 202, or the memory 222 and the data storage 202. In some embodiments, the processor 224 may fetch program instructions from the data storage 202 and load the program instructions in the memory 222. After the program instructions are loaded into the memory 222, the processor 224 may execute the program instructions.

The memory 222 and data storage 202 may include computer-readable storage media for carrying or having computer-executable instructions or data structures stored thereon. Such computer-readable storage media may include any available media that may be accessed by a general-purpose or special-purpose computer, such as the processor 224. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 224 to perform a certain operation or group of operations.

The communication unit 226 may include one or more pieces of hardware configured to receive and send communications. In some embodiments, the communication unit 226 may include one or more of an antenna, a wired port, and modulation/demodulation hardware, among other communication hardware. In particular, the communication unit 226 may be configured to receive a communication from outside the computing device 200 and to present the communication to the processor 224 or to send a communication from the processor 224 to another device or network (e.g., the network 140 of FIG. 1).

The console 201 may include one or more pieces of hardware configured to input information to the computing device 200 and to display or otherwise notify a user of the computing device 200 of a communication. In some embodiments, the console 201 may include one or more of a speaker, a microphone, a display, a keyboard, and a touch screen, among other hardware devices. In these and other embodiments, the console 201 may be configured to receive input from a user of the computing device 200.

The ARS module 110/111 may include program instructions stored in the data storage 202. The processor 224 may be configured to load the ARS module 110/111 into the memory 222 and execute the ARS module 110/111. When executing the ARS module 110/111, the processor 224 may be configured to perform operations of a vulnerability analysis that may include finding and patching software vulnerabilities as described elsewhere in this disclosure.

Similarly, the deployed program 112 may include program instructions stored in the data storage 202. The processor 224 may be configured to load the deployed program 112 into the memory 222 and execute the deployed program 112. When executing the ARS module 110/111, the processor 224 may be configured to perform operations as dictated by the deployed program 112. In some embodiments of the computing device 200, the deployed program 112 may not be included in the data storage 202. In these and other embodiments, the ARS module 110/111 may be configured to interface with the deployed program 112 using the communication unit 226, the processor 224, the memory 222, the console 201, or some combination thereof.

In view of this disclosure, it will be appreciated that modifications, additions, or omissions may be made to the computing device 200 without departing from the scope of the present disclosure. For example, in some embodiments, the computing device 200 may not include the console 201. In some embodiments, the different components of the computing device 200 may be physically separate and/or may be communicatively coupled via any suitable mechanism. For example, the data storage 202 may be part of a storage device that is separate from a server, which includes the processor 224, the memory 222, and the communication unit 226, that is communicatively coupled to the storage device.

Figure 3:
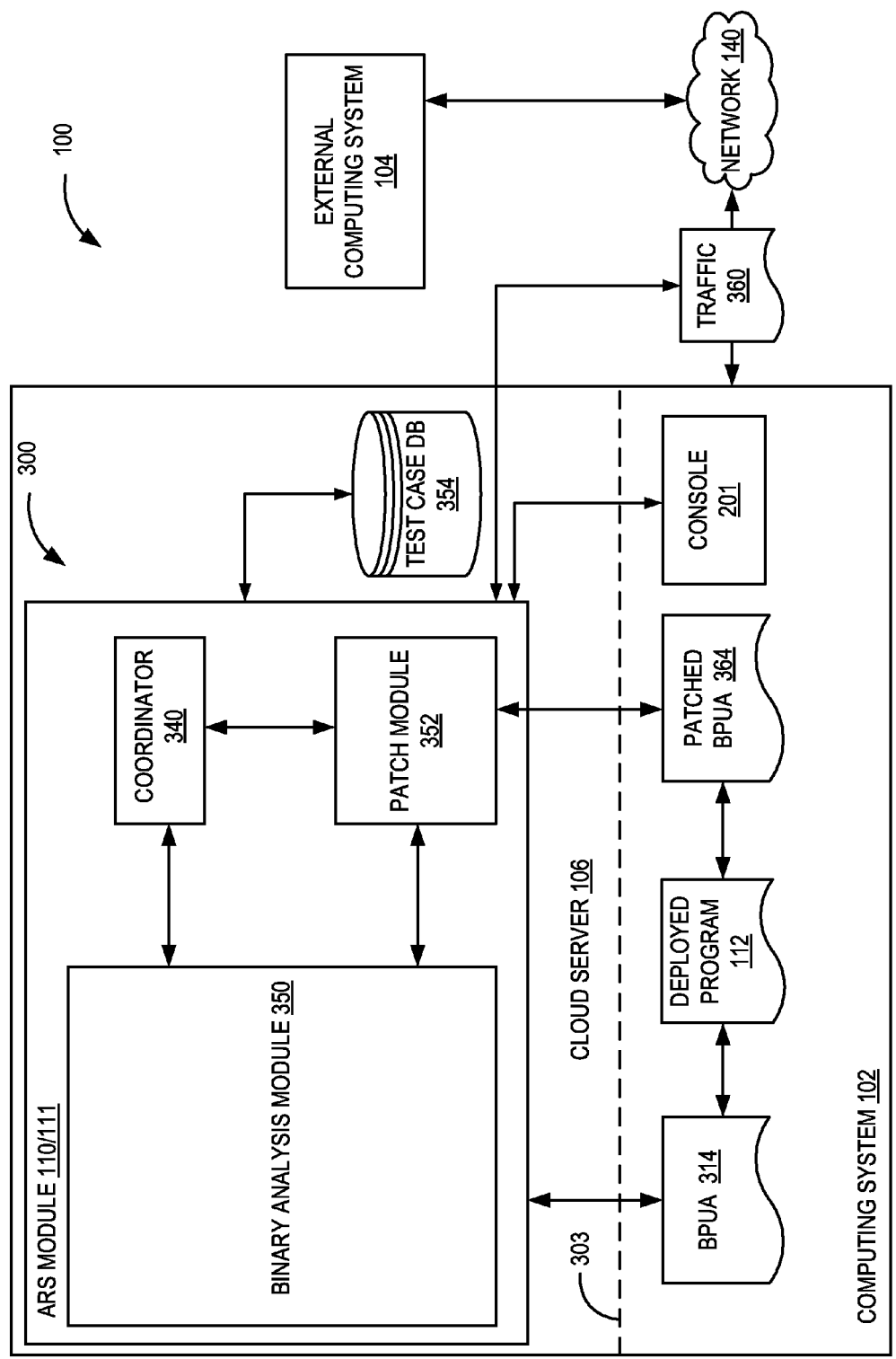
FIG. 3 illustrates an example autonomous reasoning system (ARS) module that may be implemented in the system of FIGS. 1 and 2.

FIG. 3 illustrates an example architecture 300 for the ARS module 110/111 that may be implemented in the system 100 of FIGS. 1 and 2. The ARS module 110/111 may be configured to discover negative inputs and to develop patches that modify the deployed program 112 such that the negative inputs do not result in a response that includes a vulnerability. The ARS module 110/111 may then dispatch the patch, which may be implemented in the deployed program 112.

In the embodiment of FIG. 3, the depicted architecture 300 may include a binary analysis module 350, a coordinator 340, a patch module 352, and a test case database (in FIG. 3, "test case DB") 354. The binary analysis module 350 may be configured to discover the inputs, which may include the negative inputs and positive inputs. The patch module 352 may be configured to develop, test, and dispatch a patch. The coordinator 340 may be configured to perform coordination operations and control operations that may synchronize and otherwise control the binary analysis module 350 and/or the patch module 352.

The binary analysis module 350 may be configured to analyze I/O behavior of the deployed program 112. The I/O behavior may include console interactions of a user received from the console 201 with the deployed program 112 and/or network traffic 360 (in FIG. 3 "traffic") that may be communicated between the external computing system 104 and the deployed program 112. In some embodiments, the console interactions may be included in the network traffic 360.

The analysis of the I/O behavior may include discovery of inputs and associated responses. The inputs may include positive inputs and negative inputs. In addition, the I/O behavior may be used by one or more exploration techniques implemented in the binary analysis module 350 to discover more of the inputs.

The binary analysis module 350 may be further configured to analyze a binary program under analysis (BPUA) 314. The BPUA 314 may be derived from the deployed program 112. The BPUA 314 may include a binary representation of the deployed program 112. Through use of the BPUA 314 e.g., the deployed program 112 in a binary form, the ARS module 110/111 may be implemented regardless of the programming language in which the deployed program 112 is written.

The BPUA 314 may include a local copy of the deployed program 112. For example, the ARS module 110/111 may include the local ARS module 110 loaded on the computing system 102. The deployed program 112 may also be loaded and operating locally, e.g., on the computing system 102. In embodiments in which the ARS module 110/111 includes the cloud ARS module 111, the ARS module 110/111 may be operating on the cloud server 106 while the deployed program 112 is operating on the computing system 102.

The BPUA 314 may be received by the binary analysis module 350. The binary analysis module 350 may then analyze the BPUA 314 to discover the inputs to the deployed program 112 that are negative inputs and positive inputs. The ARS module 110/111 may be configured to infer the correct and incorrect behavior using input-discovery and fuzzing. The fuzzing is a type of random testing that may include providing invalid, unexpected, or random data as inputs.

Additionally, the ARS module 110/111 may build a corpus of input/output maps based on the responses. For example, in response to an input causing the deployed program 112 to crash, the ARS module 110/111 may construct a negative test case. Similarly, in response to an input not causing the deployed program 112 to crash, ARS module 110/111 may construct a positive test case. The negative test cases and the positive test cases may be provided to the patch module 352 via the test case database 354.

The negative inputs and a response that results from processing the negative inputs may be stored in the test case database 354 as negative test cases. The positive inputs and a response that results from processing the positive inputs may be stored in the test case database 354 as positive test cases. The negative test cases and the positive test cases may combine to form an input-output test suite.

The test case database 354 may include any suitable electronic storage medium such as the memory 222 discussed with reference to FIG. 2. The test case database 354 and information (e.g., the test cases) stored thereon may be accessible by the ARS module 110/111. In the depicted embodiment, the test case database 354 is included in the computing system 102 or the cloud server 106. In some embodiments, the test case database 354 may include a remote database that is accessible via the network 140.

The patch module 352 may be configured to develop patches for one or more of the negative inputs. The patch module 352 may develop the patch based on the test cases stored in the test case database 354. In some embodiments, a fitness function may be generated based on the positive test cases and the negative test cases. The fitness function may include an objective function that summarizes how close the deployed program 112 is to achieving an aim (e.g., not responding with one or more vulnerabilities). Based on the fitness function the patch may be developed. For instance, the patch may include a mutation to the deployed program 112 based on the fitness function and genetic programming. The genetic programming may include an evolutionary-type methodology analogous to biological evolution that modifies the deployed program 112.

The patch module 352 may test a developed patch using the negative test cases and/or the positive test cases in the test case database 354. In some embodiments, the patch module 352 may use the test cases generated by the binary analysis module 350 to develop patches for the deployed program 112 while preserving existing functionality to the best extent possible based on the test cases. For example, the patch module 352 may ensure or reduce a likelihood that the patch does not modify the deployed program 112 such that new negative inputs are not created or positive inputs become negative inputs.

The patch module 352 may dispatch the patch to the deployed program 112. In the depicted embodiment, the patch may include a patched BPUA 364. The patched BPUA 364 may be incorporated in the deployed program 112. A new BPUA (e.g., BPUA 314) may be derived from the deployed program 112 that incorporates the patched BPUA 364. The binary analysis module 350 may perform a vulnerability analysis of the new BPUA 314. The patch may be dispatched on the local copy of the deployed program 112 without human interaction or in some cases even knowledge of a user.

The coordinator 340 may be configured to perform housekeeping functions. For example, the coordinator 340 may check components (e.g., 342, 304, 306, 400, 310, 302, 308, 326, 320, 400, and 324, discussed below) of the architecture 300, which may involve periodic synchronization signals such as heartbeats. The coordinator 340 may reboot the components as necessary. In some embodiments, the coordinator 340 may coordinate the ARS module 110/111 or components thereof via scripts. In the depicted embodiment, the ARS module 110/111 is depicted in a box with a dashed line 303. In embodiments in which the ARS module 110/111 is the cloud ARS module 111, the ARS module 110/111 may be loaded on the cloud server 106 and the deployed program 112, the BPUA 314, and the patched BPUA 364 may be loaded and/or communicated to the computing system 102. Accordingly, in these and other embodiments, the dashed line 303 may represent a physical separation between the cloud server 106 and the computing system 102.

In embodiments, in which the ARS module 110/111 includes the local ARS module 110, the cloud server 106 may be omitted from the system 100. The BPUA, the deployed program 112, and the patched BPUA 364 may be loaded to the computing system 102. Accordingly, in these and other embodiments, the dashed line 303 may not represent a physical separation.

Figure 4:
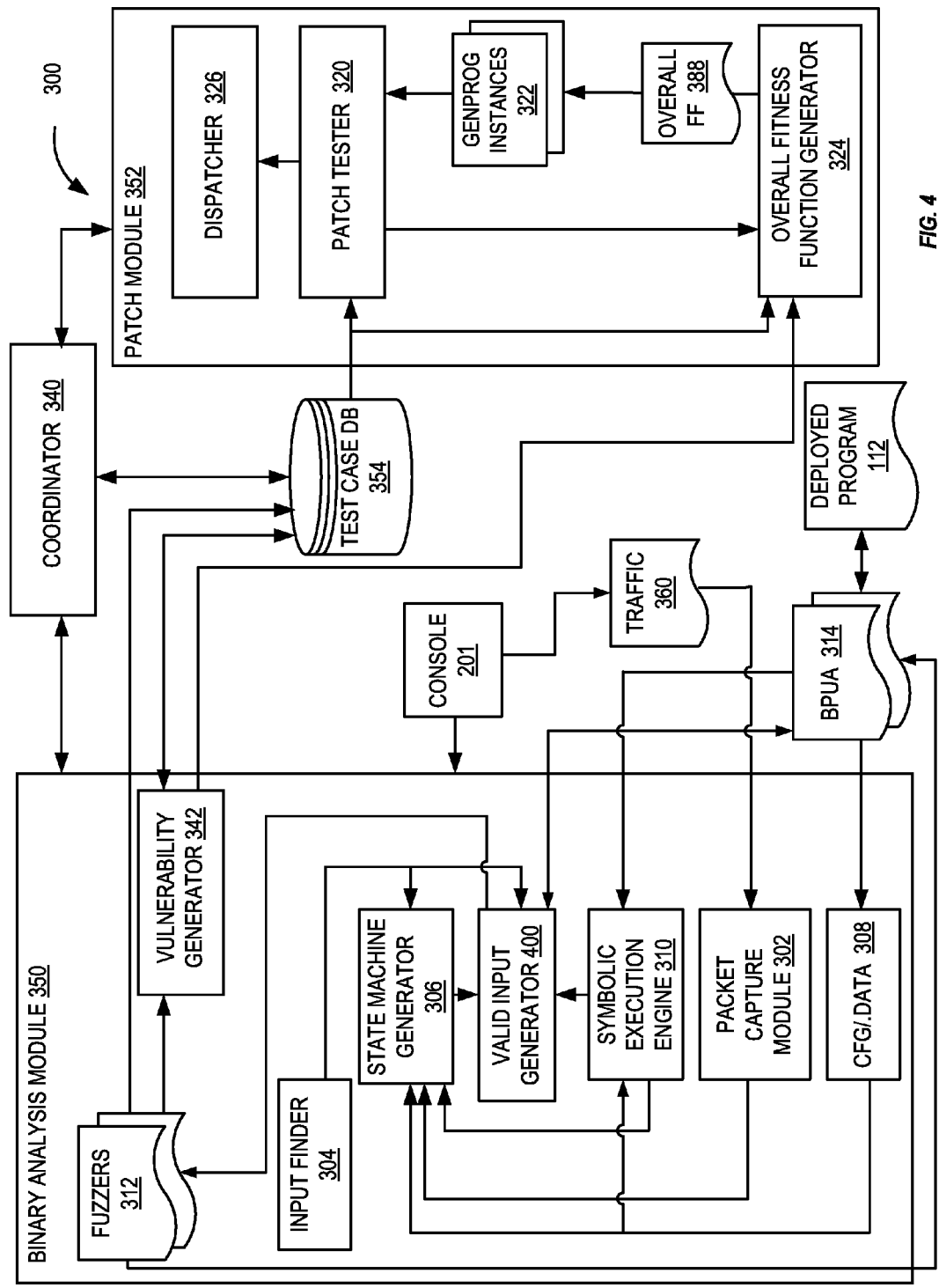
FIG. 4 illustrates an example embodiment of the ARS module of FIG. 3.

FIG. 4 illustrates a detailed view of the example architecture 300 of the ARS module 110/111 of FIG. 3. The embodiment of FIG. 4 includes examples of the binary analysis module 350, the patch module 352 along with the coordinator 340, and the test case database 354. The binary analysis module 350 may use two or more different exploration techniques to understand the input space of the BPUA 314 and to discover inputs that result in vulnerabilities of the deployed program 112. In addition, the binary analysis module 350 may develop an input-output state machine model (stateful model) that represents, at an abstract level, the I/O behavior of the BPUA 314 that has been learned to that point. The stateful model may be continuously updated as new information is inferred or discovered. The binary analysis module 350 determines whether the inputs are negative inputs or positive inputs and stores the positive test cases and negative test cases in the test case database 354. Fitness functions are generated based on the test cases, which are used to develop the patches. The patch module 352 may use the stateful model and/or the fitness functions to develop patches for the deployed program 112 while preserving existing functionality to the best extent possible.

The binary analysis module 350 may include a control flow graph (CFG)/ .data module 308 (in FIG. 4 "CFG/ .data"), a packet capture module 302, a symbolic execution engine 310, a valid input generator 400, a state machine generator 306, an input finder 304, fuzzers 312, and a vulnerability generator 342.

The input space may be explored at least partially using the input finder 304 and the symbolic execution engine 310. The input finder 304 may implement an input discovery technique that uses side-channel information to discover the inputs that the BPUA 314 accepts. For example, in some embodiments, the input finder 304 may substantially operate as described in U.S. application Ser. No. 14/620,106, which is incorporated herein by reference in its entirety. Additionally or alternatively, the input finder 304 may substantially operate as described in U.S. application Ser. No. 14/792,507, filed Jul. 6, 2015, which is incorporated herein by reference in its entirety. The input finder 304 may communicate the inputs and responses to the state machine generator 306 and/or the valid input generator 400.

The symbolic execution engine 310 may implement a symbolic execution framework. The symbolic execution framework may use white box fuzzing or smart fuzzing techniques and taint analysis to discover inputs, for example. The symbolic execution engine 310 may be configured to receive the BPUA 314, a control flow graph (CFG), an analysis of the .data field, or some combination thereof. The CFG and/or the analysis of the .data field may be used to determine which parts of the inputs to the BPUA 314 to make symbolic. The symbolic execution engine 310 may execute a symbolic execution of the BPUA 314. The symbolic execution may be used to determine path constraints and inputs that drive the deployed program 112 along certain paths. Additionally, the symbolic execution engine 310 may execute the BPUA 314 concolic mode. In concolic mode, the symbolic execution engine 310 may generate one or more test cases.

The symbolic execution engine 310 may output inputs and/or responses. For example, symbolic execution of the BPUA 314 may discover negative inputs and positive inputs with associated responses. The symbolic execution engine 310 may be configured to communicate the inputs and the associated responses to the valid input generator 400 and/or the state machine generator 306. The state machine generator 306 may update the stateful model based on the inputs and responses. The valid input generator 400 may use the input and the associated responses to drive the deployed program into deeper states to explore additional inputs that may result in vulnerabilities. Some additional details of the state machine generator 306 and the valid input generator 400 are provided below.

In some embodiments, symbolic execution may be used for taint analysis. For example, by marking program inputs symbolic/concolic and concolically executing the deployed program 112, the input data may be propagated down to a potential program location. The ARS module 110/111 may check whether the variables/registers at the potential program location are symbolic or not symbolic, which may determine whether the variables/registers are tainted. If the variables/registers are symbolic and tainted, the symbolic execution engine 310 may discover a taint source through analysis of the symbolic expression of the variable/register. With this information, heuristics may be applied to guide the fuzzers 312 to fuzz the deployed program 112 to trigger vulnerabilities.

In some implementations, the heuristics or other add-on plugins may be built on top of a selective symbolic execution engine such as S2E. The selective symbolic execution engine may support the fuzzers 312 and perform targeted search strategies to guide path exploration towards potential vulnerability locations, to trigger crashes, and to produce negative inputs.

The packet capture module 302 may parse packet capture (PCAP) files to discover inputs from I/O behavior such as the network traffic 360. The packet capture module 302 may be configured to capture network packets and/or read packet capture file. Based on the capture network packets and/or the read a packet capture file, the packet capture module 302 may generate packet information. The packet information may be communicated to the state machine generator 306. The state machine generator 306 may incorporate the packet information into the stateful model.

In some embodiments, the packet capture module 302 may analyze the provided PCAP files for I/O behavior of the BPUA 314, and may construct the initial stateful model of the BPUA 314. If the implementation includes real-time interaction with the BPUA 314 over the network (e.g., 140 of FIG. 1), the packet capture module 302 may invoke a framework such as wireshark to perform real-time capture of packets and infer behavior from the real-time capture.

The CFG/.data module 308 may be configured to receive the BPUA 314. The CFG/.data module 308 may be configured to analyze the .data field in the BPUA 314. Based on the analysis of the .data field, the CFG/.data module 308 may be configured to generate the CFG. The CFG may include information such as memory locations, variables, etc. of the BPUA 314. The CFG/.data module 308 may communicate the .data analysis and/or the CFG to the state machine generator 306 and/or the symbolic execution engine 310.

The state machine generator 306 may be configured to generate the stateful model from the CFG, the analysis of the .data field, the inputs and the responses from the input finder 304, the inputs and the responses from the symbolic execution engine 310, and the packet information. For example, the state machine generator 306 may be configured to generate the stateful model that captures a state machine of the deployed program at an abstract level. The state machine generator 306 may be configured to generate the stateful model incrementally as the inputs and the responses are discovered and/or as the patches are developed and dispatched.

In some embodiments, the state machine generator 306 may include or be used to discover one or more of the inputs and/or responses to the inputs. The inputs and the responses may be accessible by or communicated to the valid input generator 400.

Additionally, in some embodiments, the state machine generator 306 may generate the stateful model that represents the protocol of the BPUA 314. The stateful model may be generated from the information produced by the packet capture module 302 or from provided network traces in the form of PCAP files. For example, the state machine generator 306 argument may include a ReverX tool, which is discussed in João Antunes, N. F. (2011). *ReverX: Reverse Engineering of Protocols*. Lisbon: LASIGE, University of Lisboa, Portugal, which is incorporated herein by reference in its entirety.

The state machine generator 306 may infer the stateful model that may capture both input and output messages. Because the packets may be captured dynamically during execution, the state machine generator 306 may continuously refine the stateful model. In addition, the CFG may be leveraged to support the generation of the stateful model. As a result, both the inferred state machine and a program structure of the stateful model may be used to guide the fuzzers 312.

A function of the state machine generator 306 may include updating the stateful model with the inputs discovered by the input finder 304, the symbolic execution engine 310, the state machine generator 306, and the packet capture module 302. In some embodiments, the state machine generator 306 may choose between inputs discovered by the input finder 304, the symbolic execution engine 310, the state machine generator 306, or the packet capture module 302. The state machine generator 306 may choose the input to add more detail to the stateful model that has been built up to that point. The symbolic execution engine 310 may in turn be provided with the discovered inputs by the valid input generator 400 so that program execution may be driven into deeper states via white box fuzzing.

Additional negative inputs and vulnerabilities may be discovered in the deeper program state. Additionally, a function of the state machine generator 306 may include providing the input finder 304 with input information to allow the input finder 304 traverse to new program state and to learn new inputs in the new program states.

The valid input generator 400 may be configured to receive the inputs and associated responses from the input finder 304, the symbolic execution engine 310, and the state machine generator 306. The inputs and the responses from each of the input finder 304, the symbolic execution engine 310, and the state machine generator 306 may differ. For example, a first input and response discovered by the input finder 304 may not have been included in the stateful model generated by the state machine generator 306 or vice versa. Accordingly, the valid input generator 400 may communicate one or more messages to the input finder 304, the symbolic execution engine 310, and the state machine generator 306 based on any differences. Some additional details of the valid input generator 400 are provided with reference to FIG. 5.

In some embodiments, one of the messages communicated by the valid input generator 400 may include a message to the fuzzers 312. The fuzzers 312 may be configured to generate random mutations of the positive and/or negative inputs. The particular additional inputs may be based on the type of input. For example, if a positive input is a numeric type input such as 191, then the fuzzers 312 may generate additional inputs such as −191, 0, 191.000, 191×10^10, and the like. The additional input may be communicated to the BPUA 314 and introduced therein to explore whether the additional input results in a response that includes a vulnerability such as a crash response.

The fuzzers 312 may be used for partial inputs. For example, if an input includes a command "GET." The ARS module 110/111 may use the fuzzers 312 to discover some argument to go with command "GET." Accordingly, the fuzzers 312 may be given "GET aaaa" and be instructed to fuzz the "aaaa" part while not fuzzing the "GET" part. Thus, the fuzzers 312 may be used to discover vulnerable mutations of input strings. Rather than using fuzzers blindly, the valid input generator 400 may have driven the deployed program 112 to appropriate states where fuzzing explorations may begin.

The vulnerability generator 342 may be configured to use negative test cases to generate a particular fitness function that includes an object function that summarizes how close a particular solution is to achieving a particular aim. The particular fitness function may be based on a specific negative test case, which may be accessed from the test case database 354. The particular fitness function may be communicated to an overall fitness function generator 324 of the patch module 352.

The patch module 352 may include a dispatcher 326, a patch tester 320, GenProg instances 322, and the overall fitness function generator 324. The vulnerability generator 342 may interface with the overall fitness function generator 324. The overall fitness function generator 324 may be configured to use the particular fitness function of the vulnerability generator 342 and one or more positive test cases stored in the test case database 354 to generate an overall fitness function 388 (in FIG. 4, "overall FF"). The overall fitness function 388 may be used with a patch generation tool (GenProg) to develop one or more patches. In the ARS module 110/111, the particular fitness function may summarize one or more positive test cases and one or more negative test cases related to a specific vulnerability.

For example, in the depicted architecture 300, the patch module 352 may use the open-source framework 'GenProg' to generate the patches. Generally, GenProg is a genetic programming tool that produces patches based on a suite of tests of the deployed program. The suite of tests provides correct and incorrect behavior for the deployed program. In the ARS module 110/111, however, no such suite exists. Instead, the ARS module 110/111 may be configured to infer the correct and incorrect behavior using input discovery and fuzzing described above to develop the suit of tests for use by the patch module 352.

The overall fitness function 388 provides guidance for the GenProg instances 322. The GenProg instances 322 may develop the patch from the overall fitness function 388 for one or more vulnerabilities. GenProg uses genetic programming in order to 'mutate' the deployed program 112 into new programs. The overall fitness function 388 determines which of these mutations are 'fitter' than others. A goal of the ARS 110/111 may include having a deployed program 112 that polls correctly for all of the positive inputs, and does not result in a response that includes the vulnerability on one or more of the negative inputs.

In the embodiment of FIG. 4, multiple GenProg instances 322 are included in the patch module 352. The multiple GenProg instances 322 may operate in parallel to generate multiple patches based on the overall fitness function 388. In some embodiments, one GenProg instances 322 may be included in the patch module 352.

The GenProg instances 322 may communicate the patch (es) to the patch tester 320. The patch tester 320 may be configured to test the patch(es) for correctness. For example, the patch tester 320 may be configured to test fault tolerance, compatibility with the dispatched program 112, timeouts, etc. In response to the patch(es) passing the test, the patch tester 320 may communicate the patch to the dispatcher 326.

In some embodiments, the patch tester 320 may continuously evaluate the patches that have been generated against new test cases that have been logged to the test case database 354. Because a patch generated on some inputs may fail on inputs seen later, it may be desirable to update the patch as new test cases become available, even if the new inputs are positive inputs. An updated patch may then be generated. The updated patch may retain more functionality than a previous patch and thus may be dispatched via the dispatcher 326. In response to the GenProg instances 322 failing the test(s), the patch tester 320 may communicate a message to the overall fitness function generator 324 that more test cases may be needed to develop the overall fitness function 388 and the GenProg instances 322. In some embodiments, another overall fitness function 388 may be generated.

Additionally or alternatively, the patch tester 320 may implement a testing strategy to predict the quality of the patch(es). Generally, the only constraint on the GenProg is the test suite that is provided. In the ARS module 110/111, the test case database 354 is substituted for the test suite. Giving the GenProg instances 322 the test case database 354 may result in the patched program failing on inputs not yet seen. Accordingly, the ARS module 110/111 may use cross-validation or holdout techniques in which a subset of the test cases of the test case database 354 is used for generating the patch. The patch may then be tested using the unseen/unused test cases. If the patch succeeds on these unseen test cases, then it may indicate that the patch was highly localized and is thus unlikely to affect behavior on other unseen inputs. Other techniques, including code comparison techniques, may be used to determine a quality score for the patch.

The dispatcher 326 may be configured to dispatch or field the patched BPUA (364 in FIG. 3). As mentioned above, the ARS module 110/111 develops patches and dispatches the patched BPUA. The deployed program 112 and the BPUA 314 may be updated based on the BPUA. The updated BPUA becomes the BPUA 314. Thus, the updated BPUA is symbolically executed, a CFG of the updated BPUA is generated, new vulnerabilities of the updated BPUA are discovered, etc. Accordingly, the ARS module 110/111 continues to improve the deployed program 112 through iterations of patching and analysis of the BPUA 314. The patch may be dispatched on the local copy of the deployed program 112 without human interaction or in some cases even knowledge of a user.

In some applications, there may an issue of time budgeting when using the overall fitness function generator 324. For example, discovering inputs may take time. Generating a patch for vulnerability already discovered may also take time. If the patch is generated before more inputs are discovered, then the patch may fail on the new inputs. Therefore, it may be desirable to wait until a sufficiently large number of inputs have been discovered before attempting to generate the patch. An initial time for input discovery may be set aside, and patches may be generated after the initial time for input discovery has past. During the patch generating time, input and vulnerability discovery may proceed, and new patches may be attempted but may fail due to lack of time. In some embodiments, heuristics may determine the manner in which time is budgeted for patch development as it may be advantageous to develop a patch immediately even at the expense of losing functionality that may be regained later as more inputs are learned, and a patch that retains more functionality is developed.

Figure 5:
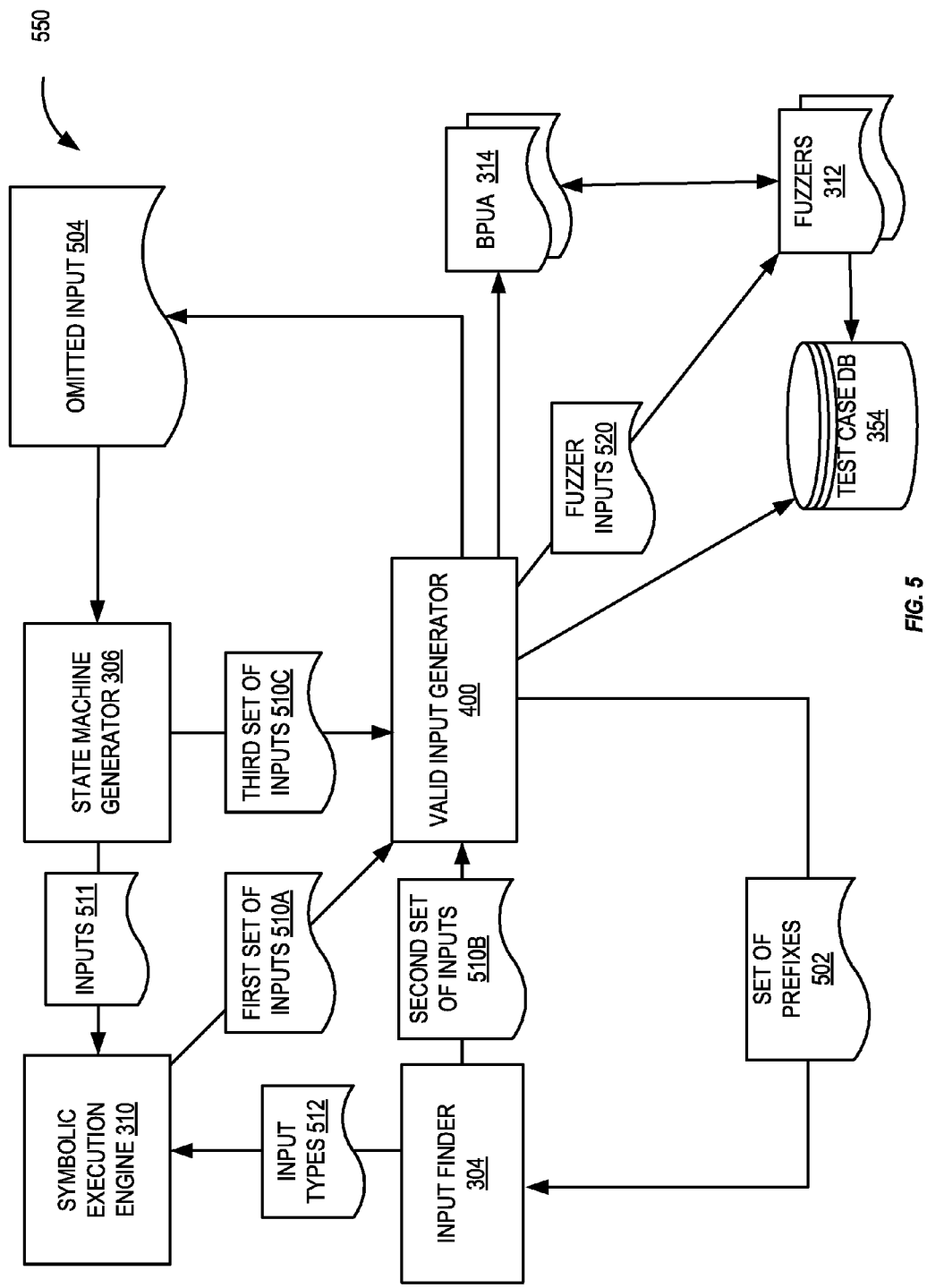
FIG. 5 illustrates an example input discovery process that may be implemented in the ARS module of FIG. 4.

FIG. 5 illustrates an example input discovery process 550 that may be implemented in the ARS module 110/111 FIGS. 1-4. In some embodiments, the input discovery process 550 may be implemented at least in part by the valid input generator 400. The input discovery process 550 may increase an ability to understand an unknown binary program (e.g., the BPUA 314 of FIG. 3) and to find its vulnerabilities.

As discussed with reference to FIG. 5, the input finder 304, the symbolic execution engine 310, and the state machine generator 306 may discover or otherwise implicate sets of inputs 510A-510C (generally, sets of inputs 510). Some of the inputs included in the sets of inputs 510 may be negative inputs and some of the inputs included in the sets of inputs 510 may be positive inputs. By discovering or otherwise implicating the sets of inputs 510 in multiple ways, (e.g., the input finder 304, the symbolic execution engine 310, and the state machine generator 306) multiple types of vulnerabilities of the dispatched program (e.g., the deployed program 112 of FIGS. 1-4) may be found and patches may be developed for the vulnerabilities. For example, using only the input finder 304 may result in a limited understanding of the dispatched program, and thus a limited number of the inputs. However, using the input finder 304 and the state machine generator 306, a more complete understanding of the dispatch program may be obtained and more of the vulnerabilities may be found and patched.

Additionally, inputs of the sets of inputs 510 discovered by one of the input finder 304, the symbolic execution engine 310, and the state machine generator 306 may be used in another of the input finder 304, the symbolic execution engine 310, and the state machine generator 306 to discover more inputs, which are referred to as derived inputs. The derived inputs may be included in subsequent sets of inputs.

For example, the valid input generator 400 may receive a first set of inputs 510A discovered in the symbolic execution engine 310 during a symbolic execution process. In addition, the valid input generator 400 may receive a second set of inputs 510B discovered in the input finder 304 during a side-channel input generation for unknown program behavior identification process and may receive a third set of inputs 510C implicated by the state machine generator 306 from a stateful model generation process. The valid input generator 400 may compare the sets of inputs 510 to determine which of the inputs are not included in all of the sets of inputs 510. The valid input generator 400 may then forward the inputs not included in all the sets of inputs 510 to the state machine generator 306, the input finder 304, or the symbolic execution engine 310 where derived inputs may be discovered.

For example, for any of the inputs omitted from the second set of inputs 510B, a set of prefixes 502 may be generated. The set of prefixes 502 of the inputs may be communicated to the input finder 304. The input finder 304 may use the set of prefixes 502 in the side-channel input generation as bases to discover one or more derived inputs. For example, the input may include "com par arg1 arg2". If the input has not been found by the input finder 304, the valid input generator 400 may generate the set of prefixes 502 that may include {"com", "com par", "com par arg1", "com par arg1 arg2"}. The set of prefixes 502 may be communicated to the input finder 304.

The input finder 304 may communicate input types 512 to the symbolic execution engine 310. One or more of the input types 512 may be based on the set of prefixes 502.

Additionally, one or more of the inputs omitted from the first set of inputs 510A (omitted input 504) may be communicated to the state machine generator 306 where the omitted input 504 may be incorporated in the stateful model. The state machine generator 306 may additionally communicate one or more inputs 511 to the symbolic execution engine 310. One or more of the inputs 511 may be based on the stateful model.

Additionally, the valid input generator 400 may determine which of the inputs of the sets of inputs 510 to include in the fuzzer inputs 520. The valid input generator 400 may communicate the fuzzer inputs 520 to the fuzzers 312. As discussed with reference to FIG. 4, the fuzzers 312 may then generate additional inputs, which may be explored. The additional inputs and responses resulting from the additional inputs may be stored as test cases (e.g., positive or negative) in the test case database 354. The fuzzer inputs 520 may be partial inputs as discussed above. The valid input generator 400 may also interact directly with the BPUA 314.

Figure 6A:
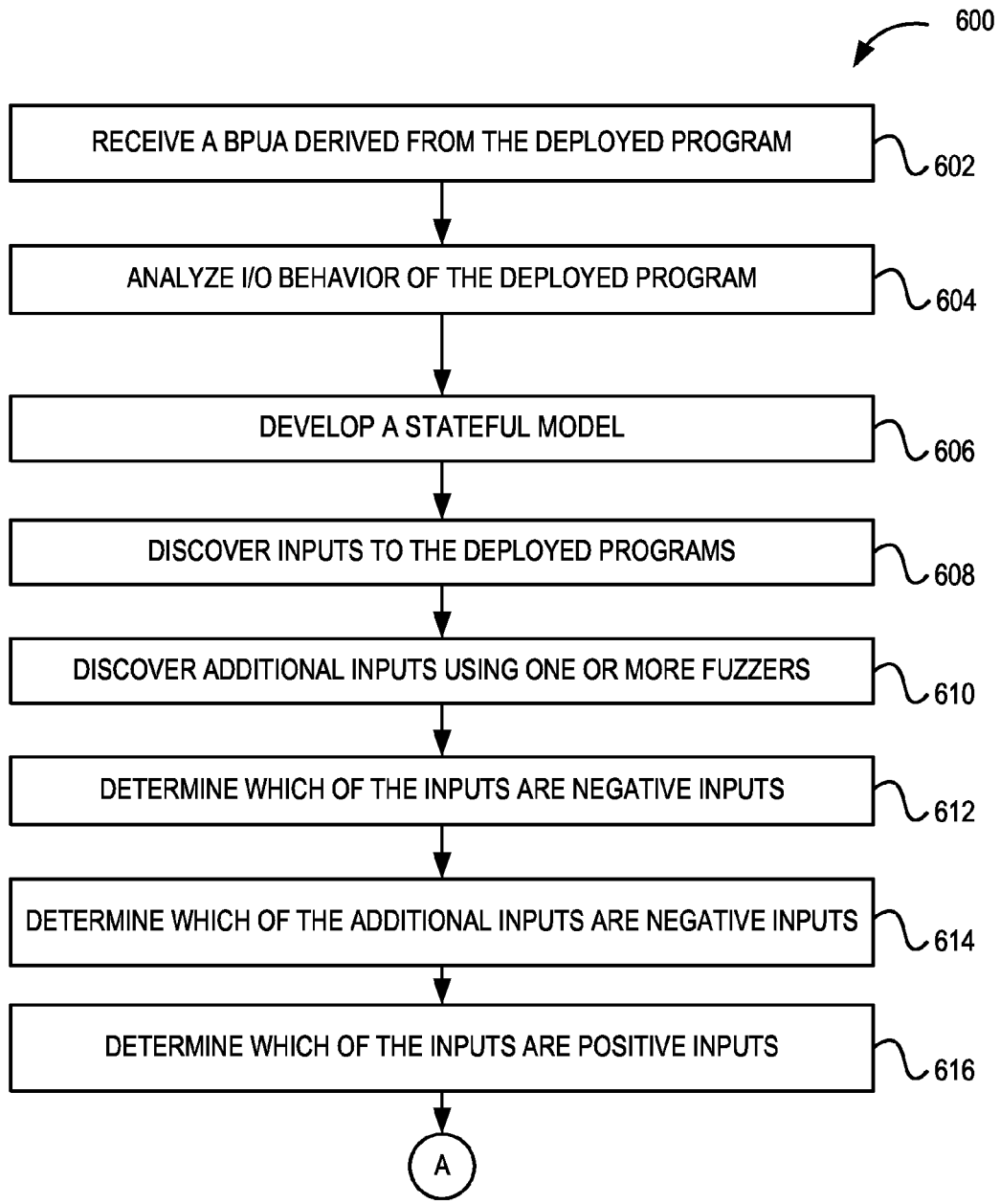
FIGS. 6A and 6B depict a flow chart of a method to analyze vulnerabilities of a deployed program, all arranged in accordance with at least one embodiment described herein.
Figure 6B:
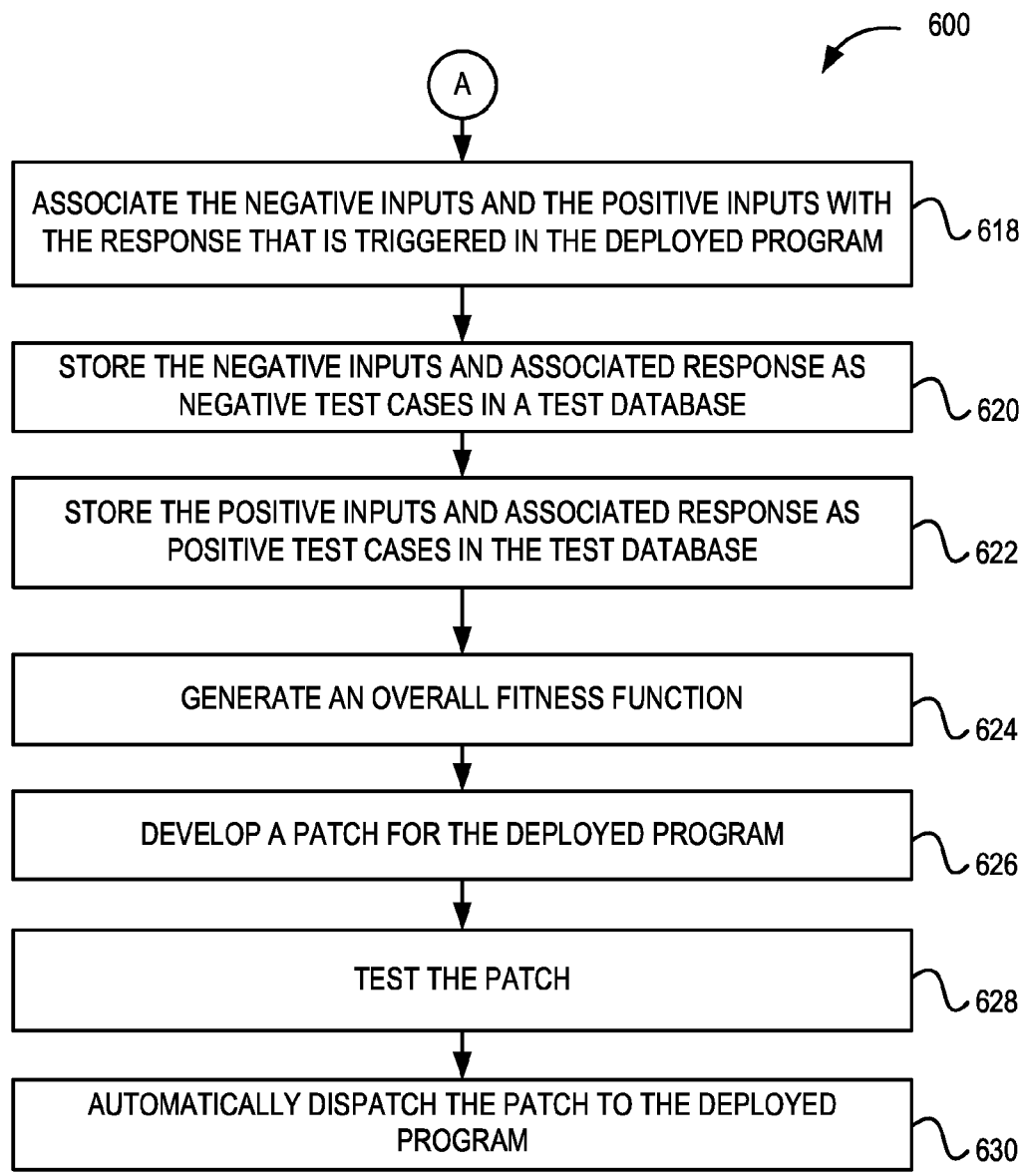

FIGS. 6A and 6B depict a flow chart of a method 600 of vulnerability analysis of a deployed program, arranged in accordance with at least one embodiment described herein. The method 600 may be performed by the computing system 102 described with reference to FIGS. 1 and 2 or some component thereof such as the ARS module 110/111. In some embodiments, the computing system 102 or another computing device may include or may be communicatively coupled to a non-transitory computer-readable medium (e.g., the memory 222 of FIG. 2) having stored thereon programming code or instructions that are executable by a processor (such as the processor 224 of FIG. 2) to cause a computing device and/or the computing system 102 to perform method 600. Additionally or alternatively, the computing system 102 may include the processor 224 described above that is configured to execute computer instructions to cause the computing system 102 or another computing device to perform the method 600. Although illustrated as discrete blocks, various blocks may be divided into additional blocks, combined into fewer blocks, or eliminated, depending on the desired implementation.

With reference to FIG. 6A, the method 600 may begin at block 602 in which a BPUA may be received. The BPUA may be derived from the deployed program. At block 604, I/O behavior of the deployed program may be analyzed. The I/O behavior may include console interactions of a user with the deployed program and captured network traffic communicated with the deployed program. At block 606, a stateful model may be developed. The stateful model may represent, at an abstract level, the I/O behavior of the BPUA that has been learned to that point. The stateful model may be a basis of patch development using a genetic programming-based repair framework.

At block 608, inputs to the deployed program may be discovered. The inputs may be discovered based on application of two or more exploration techniques to the BPUA and analysis of the I/O behavior. In some embodiments, inputs may be discovered by receiving a first set of inputs discovered during the symbolic execution process, a second set of inputs discovered during the side-channel input generation, and a third set of inputs from the stateful model generation process. The first set of inputs, the second set of inputs, and the third set of inputs may be compared to determine which of the inputs are not included in all of the first set of inputs, the second set of inputs, and the third set of inputs. For one or more of the inputs omitted from the second set of inputs, the method 600 may include generating a set of prefixes of the omitted inputs. The set of prefixes may be used in the side-channel input generation as bases to discover one or more other inputs. For one or more of the inputs omitted from the first set of inputs, the method 600 may include incorporating the omitted inputs in the stateful model.

At block 610, additional inputs may be discovered using one or more fuzzers. At block 612, it may be determined which of the inputs are negative inputs. At block 614, it may be determined which of the additional inputs are negative inputs. At block 616, it may be determined which of the inputs are positive inputs. In some embodiments, vulnerability may include a memory corruption error, a buffer overflow, a software crash, and an arithmetic error.

In some embodiments, the exploration techniques may include symbolic execution process of the BPUA; side-channel input generation process for unknown program behavior; and stateful model generation process configured to capture a state machine of the deployed program at an abstract level, or some example thereof. The state machine may be representative of the I/O behavior of the BPUA learned to that point at an abstract level. The state machine model is a basis of patch development using a genetic programming-based repair framework.

At block 618, the negative inputs and the positive inputs may be associated with the response that is triggered in the deployed program. The responses may be ascertained through introduction of the negative inputs and the positive inputs are introduced to the exploration techniques. At block 620, one or more of the negative inputs and associated response may be stored as negative test cases in a test database. At block 622, one or more of the positive inputs and associated response may be stored as positive test cases in the test database.

At block 624, a fitness function may be generated. The fitness function may be based on the positive test cases and negative test cases. At block 626, a patch may be developed for the deployed program. The patch may be developed for the deployed program based on the negative inputs and triggered responses. The patch may be configured to modify the deployed program to process at least some of the negative inputs without triggering a response that includes the vulnerability. The patch may include a mutation to the deployed program based on the fitness function and genetic programming. At block 628, the patch may be tested. For example, the patch may be tested using the positive test cases and negative test cases. At block 630, automatically dispatching the patch to the deployed program occurs. In some embodiments, before automatically dispatching the patch to the deployed program the patch may be tested. In some embodiments, the analyzing the I/O behavior, the discovering inputs, the introducing the inputs, the determining, the developing the patch, and the dispatching may occur while the deployed program is running.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include tangible or non-transitory computer-readable storage media including RAM, ROM, EEPROM, CD-ROM or other optical disk storage, magnetic disk storage or other magnetic storage devices, or any other non-transitory storage medium that may be used to carry or store desired program code in the form of computer-executable instructions or data structures and that may be accessed by a general-purpose or special-purpose computer. Combinations of the above may also be included within the scope of computer-readable media.

Computer-executable instructions comprise, for example, instructions and data, which cause a general-purpose computer, special-purpose computer, or special-purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module," "component," and/or "engine" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modules running on a computing system.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description of embodiments, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present invention have been described in detail, it should be understood that the various changes, substitutions, and alterations could be made hereto without departing from the spirit and scope of the invention.

What is claimed is:

1. A method of vulnerability analysis of a deployed program, the method comprising:
   receiving a binary program under analysis (BPUA) derived from the deployed program;
   analyzing input/output (I/O) behavior of the deployed program;
   discovering inputs to the deployed program based on application of two or more exploration techniques to the BPUA and analysis of the I/O behavior, the inputs including a first set of inputs discovered during a symbolic execution process, a second set of inputs discovered during a side-channel input generation, and a third set of inputs from an I/O state machine module (stateful model) generation process;
   determining which of the inputs are negative inputs, the negative inputs including a portion of the inputs that trigger a response that includes a vulnerability of the deployed program;
   based on the negative inputs and triggered responses, developing a patch for the deployed program that modifies the deployed program to process at least some of the negative inputs without triggering a response that includes the vulnerability; and
   automatically dispatching the patch to the deployed program.

2. The method of claim 1, further comprising:
   determining which of the inputs are positive inputs, the positive inputs including a portion of the inputs that trigger responses that do not include a vulnerability of the deployed program;
   associating each of the negative inputs and each of the positive inputs with the response that is triggered in the deployed program;
   storing each of the negative inputs and associated response as negative test cases in a test database; and
   storing each of the positive inputs and associated response as positive test cases in the test database.

3. The method of claim 2, further comprising generating an overall fitness function based on the positive test cases and negative test cases, wherein the patch includes a mutation to the deployed program based on the fitness function and genetic programming.

4. The method of claim 2, further comprising testing the patch using the positive test cases and negative test cases before automatically dispatching the patch to the deployed program.

5. The method of claim 1, further comprising:
   further discovering additional inputs using one or more fuzzers; and
   determining which of the additional inputs are negative inputs.

6. The method of claim 1, wherein the vulnerability includes a memory corruption error, a buffer overflow, a software crash, and an arithmetic error.

7. The method of claim 1, wherein:
   the exploration techniques include symbolic execution of the BPUA and a side-channel input generation process for unknown program behavior; and
   the I/O behavior includes console interactions of a user with the deployed program and captured network traffic communicated with the deployed program.

8. The method of claim 1, wherein the discovering inputs includes:
   comparing the first set of inputs, the second set of inputs, and the third set of inputs to determine which of the inputs are not included in all of the first set of inputs, the second set of inputs, and the third set of inputs;
   for one or more of the inputs omitted from the second set of inputs, generating a set of prefixes of omitted inputs and using the set of prefixes in the side-channel input generation as bases to discover one or more other inputs; and
   for one or more of the inputs omitted from the first set of inputs, incorporating the omitted inputs in the stateful model.

9. The method of claim 1, further comprising developing the stateful model that represents, at an abstract level, the I/O behavior of the BPUA that has been learned to that point, wherein the stateful model is a basis of patch development using a genetic programming-based repair framework.

10. The method of claim 1, wherein the analyzing the I/O behavior, the discovering inputs, the determining, the developing the patch, and the dispatching occur while the deployed program is running.

11. One or more non-transitory computer-readable media having encoded therein programming code executable by one or more processors to perform operations, the operations comprising:
   receiving a binary program under analysis (BPUA) derived from a deployed program;

analyzing input/output (I/O) behavior of the deployed program;

discovering inputs to the deployed program based on application of two or more exploration techniques to the BPUA and analysis of the I/O behavior, the inputs including a first set of inputs discovered during a symbolic execution process, a second set of inputs discovered during a side-channel input generation, and a third set of inputs from an I/O state machine module (stateful model) generation process;

determining which of the inputs are negative inputs, the negative inputs including a portion of the inputs that trigger a response that includes a vulnerability of the deployed program;

based on the negative inputs and triggered responses, developing a patch for the deployed program that modifies the deployed program to process at least some of the negative inputs without triggering a response that includes the vulnerability; and automatically dispatching the patch to the deployed program.

12. The non-transitory computer-readable media of claim 11, wherein the operations further comprise:

determining which of the inputs are positive inputs, the positive inputs including a portion of the inputs that trigger responses that do not include a vulnerability of the deployed program;

associating each of the negative inputs and each of the positive inputs with the response that is triggered in the deployed program;

storing each of the negative inputs and associated response as negative test cases in a test database; and storing each of the positive inputs and associated response as positive test cases in the test database.

13. The non-transitory computer-readable media of claim 12, wherein the operations further comprise generating an overall fitness function based on the positive test cases and negative test cases, wherein the patch includes a mutation to the deployed program based on the fitness function and genetic programming.

14. The non-transitory computer-readable media of claim 12, wherein the operations further comprise testing the patch using the positive test cases and negative test cases before automatically dispatching the patch to the deployed program.

15. The non-transitory computer-readable media of claim 11, wherein the operations further comprise:

further discovering additional inputs using one or more fuzzers; and determining which of the additional inputs are negative inputs.

16. The non-transitory computer-readable media of claim 11, wherein the vulnerability includes a memory corruption error, a buffer overflow, a software crash, and an arithmetic error.

17. The non-transitory computer-readable media of claim 11, wherein:

the exploration techniques include symbolic execution of the BPUA and a side-channel input generation process for unknown program behavior; and the I/O behavior includes console interactions of a user with the deployed program and captured network traffic communicated with the deployed program.

18. The non-transitory computer-readable media of claim 11, wherein the discovering inputs includes:

comparing the first set of inputs, the second set of inputs, and the third set of inputs to determine which of the inputs are not included in all of the first set of inputs, the second set of inputs, and the third set of inputs;

for one or more of the inputs omitted from the second set of inputs, generating a set of prefixes of omitted inputs and using the set of prefixes in the side-channel input generation as bases to discover one or more other inputs; and for one or more of the inputs omitted from the first set of inputs, incorporating the omitted inputs in the stateful model.

19. The non-transitory computer-readable media of claim 11, wherein the operations further comprise developing the stateful model that represents, at an abstract level, the I/O behavior of the BPUA that has been learned to that point, wherein the stateful model is a basis of patch development using a genetic programming-based repair framework.

20. The non-transitory computer-readable media of claim 11, wherein the analyzing the I/O behavior, the discovering inputs, the determining, the developing the patch, and the dispatching occur while the deployed program is running.

* * * * *